US012642285B2

(12) United States Patent　　(10) Patent No.: US 12,642,285 B2
Rossi et al.　　(45) Date of Patent: Jun. 2, 2026

(54) DIETARY SUPPLEMENT DERIVED FROM THE RUMINAL CONTENT OF BOVINES AND SHEEP AND THE CAECAL CONTENT OF RABBIT

(71) Applicants: ORBIOTEK SÀRL, Lausanne (CH); UNIVERSITA DEGLI STUDI DI CAMERINO, Camerino (IT)

(72) Inventors: Giacomo Rossi, Matelica (IT); Maria Cristina Verdenelli, Camerino (IT)

(73) Assignees: ORBIOTEK SARL, Lausanne (CH); UNIVERSITA DEGLI STUDI DI CAMERINO, Camerino (IT)

( * ) Notice: Subject to any disclaimer, the term of this patent is extended or adjusted under 35 U.S.C. 154(b) by 279 days.

(21) Appl. No.: 18/275,490

(22) PCT Filed: Jan. 28, 2022

(86) PCT No.: PCT/EP2022/051994
§ 371 (c)(1),
(2) Date: Aug. 2, 2023

(87) PCT Pub. No.: WO2022/162118
PCT Pub. Date: Aug. 4, 2022

(65) Prior Publication Data
US 2024/0306671 A1　　Sep. 19, 2024

(30) Foreign Application Priority Data

Feb. 1, 2021　(IT) ......................... 102021000002000

(51) Int. Cl.
*A23K 20/147* (2016.01)
*A23K 10/16* (2016.01)
*A23K 20/158* (2016.01)
*A23K 20/174* (2016.01)
*A23K 40/00* (2016.01)
*A23K 50/30* (2016.01)
*A23K 50/40* (2016.01)

(52) U.S. Cl.
CPC ............ *A23K 20/147* (2016.05); *A23K 10/16* (2016.05); *A23K 20/158* (2016.05); *A23K 20/174* (2016.05); *A23K 40/00* (2016.05); *A23K 50/30* (2016.05); *A23K 50/40* (2016.05)

(58) Field of Classification Search
CPC ........ A23K 10/00; A23K 20/00; A23K 30/00; A23K 40/00; A23K 50/00
See application file for complete search history.

(56) References Cited

U.S. PATENT DOCUMENTS 3,243,299 A　　3/1966　Mecho et al.
2012/0316320 A1　12/2012　Calt, Jr. et al.

FOREIGN PATENT DOCUMENTS

CN　　104997813　　10/2015

OTHER PUBLICATIONS

Simonova, "Enterococci from rabbits—potential feed additive", Czech J. Anim. Sci., 2005, 50(9), pp. 416-421 (Year: 2005).*
Linaje, "Characterization of faecal enterococci from rabbits for the selection of probiotic strains", Journal of Applied Microbiology 2004, 96, pp. 761-771 (Year: 2004).*
Pique, "Health Benefits of Heat-Killed (Tyndallized) Probiotics: An Overview", International Journal of Molecular Sciences, 2019, 20(2534), pp. 1-30 (Year: 2019).*
Whitehouse-Tedd et al., "Dietary Factors Associated with Faecal Consistency and Other Indicators of Gastrointestinal Health in the Captive Cheetah (*Acinonyx jubatus*)" PLoS ONE, 2015, v 10, n 4, p. 1-20: e0120903. doi:10.1371/journal.pone.0120903.
Zmora et al., "Personalized Gut Mucosal Colonization Resistance to Empiric Probiotics Is Associated with Unique Host and Microbiome Features" Cell, 2018, v 174, p. 1388-1405.
Wernimont et al., "The Effects of Nutrition on the Gastrointestinal Microbiome of Cats and Dogs: Impact on Health and Disease" Nutrition and the Gastrointestinal Microbiome, Jun. 2020, v 11, Article 1266, p. 1-24.
Uyeno et al., "Effect of Probiotics/Prebiotics on Cattle Health and Productivity" Microbes Environ. vol. 30, No. 2, 126-132, 2015.
Verbrugghe et al., "Oligofructose and inulin modulate glucose and amino acid metabolism through propionate" production in normal-weight and obese cats British Journal of Nutrition (2009), 102, 694-702.
Adeniji et al., "Utilization of flavor treated blood-rumen content mixture in the diets of laying hens" Nigerian Journal of Animal Production, Jan. 2002, v 29(1), p. 34-39.
Totton et al., "The effectiveness of selected feed and water additives for reducing *Salmonella* spp. of public health importance in broiler chickens: A systematic review, meta-analysis, and meta-regression approach" Preventive Veterinary Medicine 106 (2012) 197-213.
Togun et al., "Effect of Replacing Maize With a Mixture of Rumen Content and Blood Meal on the Performances of Growing Rabbits: Initial Study With Mash Feed" World Rabbit Sci. 2009, 17: 21-26.
Tordiffe et al., "Comparative Serum Fatty Acid Profiles of Captive and Free-Ranging Cheetahs (*Acinonyx jubatus*) in Namibia" PLoS ONE 11(12): e0167608. doi:10.1371/journal. pone.0167608.
Taverniti et al., "The immunomodulatory properties of probiotic microorganisms beyond their viability (ghost probiotics: proposal of paraprobiotic concept)" Genes Nutr (2011) 6:261-274.

(Continued)

*Primary Examiner* — Changqing Li
(74) *Attorney, Agent, or Firm* — Gregory P. Einhorn; Greer, Burns & Crain, Ltd.

(57) ABSTRACT

A composition comprising the dry extract of ruminal content of bovine and sheep and the caecal content of rabbit is described which can be used as a powdered dietary supplement for pets and farm animals as it retains intact the nutritional components of the starting material, such as volatile fatty acids, amino acids, vitamins, minerals and dietary fibres, but it also contains a very high load of bacterial derivatives, protozoa and yeasts, which are able to stimulate the immune system of the gastrointestinal tract; and the process for preparing it.

17 Claims, No Drawings

(56) References Cited

OTHER PUBLICATIONS

Terio et al., "Characterization of the Gastric Immune Response in Cheetahs (*Acinonyx jubatus*) With Helicobacter-Associated Gastritis" Veterinary Pathology, 2012, 49(5) 824-833.

Skoglund et al., "Ancient Wolf Genome Reveals an Early Divergence of Domestic Dog Ancestors and Admixture into High-Latitude Breeds" Current Biology 25, 1515-1519, Jun. 1, 2015.

Suez et al., "Post-Antibiotic Gut Mucosal Microbiome Reconstitution Is Impaired by Probiotics and Improved by Autologous FMT" Cell 174, 1406-1423, Sep. 6, 2018.

Swanson et al., "Nutritional Genomics: Implications for Companion Animals" American Society for Nutritional Sciences, 2003, p. 3033-3040.

Schmitz et al., "Understanding the canine intestinal microbiota and its modification by pro-, pre- and synbiotics—what is the evidence?" Veterinary Medicine and Science (2016), 2, pp. 71-94.

Plantinga et al., "Estimation of the dietary nutrient profile of free-roaming feral cats: possible implications for nutrition of domestic cats" British Journal of Nutrition (2011), 106, S35-S48.

Dairo et al., "Performance evaluation of growing rabbits fed varying levels of rumen content and blood rumen content mixture" Nigerian Journal of Animal Production—Jan. 2005, v 32(I), n 67, p. 67-72.

Ragland et al., "From bacterial killing to immune modulation: Recent insights into the functions of lysozyme" PLoS Pathog 13(9): e1006512.

Beitz et al., "Your dogs nutritional needs" Nutrient Requirements of Dogs and Cats. p. 1-13.

Lane et al., "Effect of Diet on the Incidence of and Mortality Owing to Gastritis and Renal Disease in Captive Cheetahs (*Acinonyx jubatus*) in South Africa" Zoo Biology 31 : 669-682 (2012).

Nogueira et al., "Dietary supplementation of a fiber-prebiotic and saccharin-eugenol blend in extruded diets fed to dogs" Journal of Animal Science, 2019, 4519-4531.

Isolauri et al., "Probiotics: effects on immunity" Am J Clin Nutr 2001;73(suppl):444S-50S.

Van Soest et al., "Symposium: Carbohydrate Methodology, Metabolism, and Nutritional Implications in Dairy Cattle" J Dairy Sci, 1991, v 74, p. 3583-3597.

Herstad et al., "Effects of a probiotic intervention in acute canine gastroenteritis—a controlled clinical trial" Journal of Small Animal Practice (2010) 51, 34-38.

Elfaki et al., "Effect of Dietary Dried Rumen Content on Broiler Performance, Plasma Constituents and Carcass Characteristics" Global Journal of Animal Scientific Research. 3(1): 264-270. 2015.

Esonu et al., "Evaluation of Performance, Organ Characteristics and Economic Analysis of Broiler Finisher Fed Dried Rumen Digesta" International Journal of Poultry Science • Dec. 2006, v 5, n 12, p. 1116-1118.

Macfarlane et al., "Bacterial metabolism and health-related effects of galacto-oligosaccharides and other prebiotics" The Society for Applied Microbiology, Journal of Applied Microbiology 104 (2008) 305-344.

Marsella et al., "Early exposure to probiotics in a canine model of atopic dermatitis has long-term clinical and immunological effects" Veterinary Immunology and Immunopathology 146 (2012) 185-189.

Massimino et al., "Fermentable Dietary Fiber Increases GLP-1 Secretion and Improves Glucose Homeostasis Despite Increased Intestinal Glucose Transport Capacity in Healthy Dogs" 1998 American Society for Nutritional Sciences, p. 1786-1793.

Matthewman et al., "Pre and Probiotics—Practical Applications for VNS in Practice" Vet Times, Jan. 1, 2023, https://www.vettimes.co.uk, p. 1-6.

Lee et al., "Therapeutic effect of tyndallized Lactobacillus rhamnosus IDCC 3201 on atopic dermatitis mediated by down-regulation of immunoglobulin E in NC/Nga mice" Microbiol Immunol 2016; 60: 468-476.

Kim et al., "Reduction of Bacillus cereus spores in sikhye, a traditional Korean rice beverage, by modified tyndallization processes with and without carbon dioxide injection" The Society for Applied Microbiology, 2012, p. 1-6.

Saez-Plaza et al., "An Overview of the Kjeldahl Method of Nitrogen Determination. Part II. Sample Preparation, Working Scale, Instrumental Finish, and Quality Control" Critical Reviews in Analytical Chemistry, 43:224-272, 2013.

MacDonald et al., "Nutrition of the Domestic Cat, a Mammalian Carnivore" Ann. Rev. Nutr. 1984.4:521-62.

Dickson et al., "The effect of enterococci on feline Tritrichomonas foetus infection in vitro" Veterinary Parasitology 273 (2019) 90-96.

Driscoll et al., "The Near Eastern Origin of Cat Domestication" Science. Jul. 27, 2007; 317(5837): 519-523.

Driscoll et al., "From wild animals to domestic pets, an evolutionary view of domestication" PNAS, Jun. 16, 2009, v 106, suppl. 1, p. 9971-9978.

Castro-Bravo et al., "Interactions of Surface Exopolysaccharides From Bifidobacterium and Lactobacillus Within the Intestinal Environment" Frontiers in Microbiology, Oct. 2018, v 9. Article 2426, p. 1-15.

Daelemans et al., "Recent advances in understanding and managing infantile colic" F1000Research 2018, 7(F1000 Faculty Rev):1426 Last updated: Sep. 7, 2018, p. 1-8.

Depauw et al., "Animal fibre: The forgotten nutrient in strict carnivores? First insights in the cheetah" Journal of Animal Physiology and Animal Nutrition, 2011, p. 1-9.

Depauw et al., "Fermentation of animal components in strict carnivores: A comparative study with cheetah fecal noculum" Journal of Animal Science—Jan. 2012, J. Anim. Sci. 2012. 90: 2540-2548.

Deshpande et al., "Para-probiotics for Preterm Neonates—The Next Frontier" Nutrients 2018, 10, 871; doi: 10.3390/nu10070871.

Burta et al., "Efficacy and safety of APT036 versus simethicone in the treatment of functional bloating: a multicentre, randomised, double-blind, parallel group, clinical study" Translational Gastroenterology and Hepatology, 2018, v 3, n 72, p. 1-8.

Bosch et al., "Dietary nutrient profiles of wild wolves: insights for optimal dog nutrition?" British Journal of Nutrition (2015), 113, S40-S54.

Buff et al., "Natural pet food: A review of natural diets and their impact on canine and feline physiology" J. Anim. Sci. 2014.92:3781-3791.

Benyacoub et al., "Supplementation of Food with Enterococcus faecium (SF68) Stimulates Immune Functions in Young Dogs" American Society for Nutritional Sciences, 2003, p. 1158-1162.

Odunsi "Blend of Bovine Blood and Rumen Digesta as a Replacement for Fishmeal and Groundnut Cake in Layer Diets" International Journal of Poultry Science • Jan. 2003, v 2, n 1, p. 58-61.

Albalfi-Hurtado et al., "Determination of water-soluble vitamins in infant milk by high-performance liquid chromatography" Journal of Chromatography A, 778 (1997) 247-253.

Canducci et al., "A lyophilized and inactivated culture of Lactobacillus acidophilus increases Helicobacter pylori eradication rates" Aliment Pharmacol Ther 2000; 14: 1625-1629.

Hesta et al., "The effect of a commercial high-®bre diet and an iso-malto-oligosaccharide-supplemented diet on post-prandial glucose concentrations in dogs" J. Anim. Physiol. a. Anim. Nutr. 85 (2001), 217-221.

Agbabiaka et al., "Nutritive value of dried rumen digesta as replacement for soybean in diets of Nile tilapia (*Oreochromis nilocus*) fingerlings" Pakistan Journal of Nutrition, v 10, n 6, p. 568-571, 2011.

Agbabiaka et al., "Growth response of African catfish (*Clarias gariepinus,* Burchell 1822) to dried rumen digesta as a dietary supplement" Pakistan Journal of Nutrition, v 10, n 6, p. 564-567, 2011.

Akhter et al., "Probiotics and prebiotics associated with aquaculture: A review" Fish & Shellfish Immunology 45 (2015) 733-741.

Michelland et al., "Molecular analysis of the bacterial community in digestive tract of rabbit", Apr. 1, 2010 (Apr. 1, 2010), vol. 16, No. 2, p. 61-65.

(56)  References Cited

OTHER PUBLICATIONS

Abecia L et al, "Biodiversity and fermentative activity of caecal microbial communities in wild and farm rabbits from Spain", Apr. 16, 2012 (Apr. 16, 2012), vol. 18, No. 3, p. 344-349.

* cited by examiner

DIETARY SUPPLEMENT DERIVED FROM THE RUMINAL CONTENT OF BOVINES AND SHEEP AND THE CAECAL CONTENT OF RABBIT

This application is a national phase application claiming benefit of priority under 35 U.S.C. § 371 to Patent Convention Treaty (PCT) International Application serial number PCT/EP2022/051994, filed Jan. 28, 2022, now pending, which claims the benefit of priority to Italian patent No. 102021000002000, filed on Feb. 1, 2021. The aforementioned applications are expressly incorporated herein by reference in their entirety and for all purposes.

BACKGROUND OF THE INVENTION

The present invention refers to the field of dietary supplements in that it refers to a so-called biologically appropriate probiotic and prebiotic dietary supplement (BAPPAS), preferably in freeze-dried or powder form, which derives from the ruminal content of bovines and sheep and from the caecal content of rabbit, and is used for dietary supplementation, as it retains intact the nutritional components of the starting material, such as volatile fatty acids, amino acids, vitamins, minerals and dietary fibre, it contains a very high load of bacterial derivatives, protozoa and yeasts, which are able to stimulate the immune system of the gastrointestinal tract of the animals, especially of pets such as dogs and cats.

PRIOR ART

Ruminal predigested content and caecal content are one of the by-products of slaughtering and consist of ingested and fermented/predigested and non-predigested plant food as well as rumen/caecal microorganisms and final products of the metabolic activities of microorganisms such as microbial proteins, amino acids, vitamins and volatile fatty acids. These typical gastrointestinal digests do not contain anti-physiological factors (Okpanachi, U., Aribido, S. O., Daikwo, I. S. 2010. Growth and haematological response of growing rabbits to diets containing graded levels of sun dried bovine rumen content. African Journal of Food, Agriculture, Nutrition and Development. 10: 4444-4457). Crude protein (CP) in dried ruminal digestate (DRD) and dried colic/caecal content (DCC) varies from 9% to 20% of dry matter (DM) and, if properly treated, can be used as a source of protein in animal feed, reducing the burden of DRD/DCC residues resulting from slaughter, avoiding leaving these by-products to decompose or to special disposal, with high environmental impact and disposal problems (Adeniji, A. A., Balogun, O. O., 2002. Utilization of flavor treated blood-rumen content mixture in the diets of laying hens. Niger J. Anim. Prod. 29, 34-39; Agbabiaka, L. A., Anukam K. U., & Nwachukwu, V. N. (2011b). Nutritive Value of Dried Rumen Digesta as Replacement for Soybean in Diets of Nile Tilapia (Oreochromis niloticus) Fingerlings. Pakistan Journal of Nutrition. 10(6): 568-571 is now described. Esonu, B. O., Ogbonna, U. D., Anyanwu, G. A., Emelanom, O. O., Uchegbu, M. C., Etuk, M. C., & Udedibe, A. B. I. 2006. Evaluation of Performance, Organ Characteristics and Economic Analysis of Broiler Finisher Fed Dried Rumen Digesta. Int. J. Poult. Sci. 5:1116-1118). Several studies have been carried out, especially with regard to the supplementation of DRD in diets of fish (Agbabiaka, L. A., Amadi, S. A., Oyinioye, G. O. M., Adedokun, I. I., Ekeocha, C. A. (2011a). Growth Response of African Catfish (Clarias gariepinus, Burchell 1822) to Dried Rumen as a Dietary Supplement. Pak. J. Nutr., 10(6): 564-567; Agbabiaka, L. A., Anukam K. U., & Nwachukwu, V. N. (2011b). Nutritive Value of Dried Rumen Digesta as Replacement for Soybean in Diets of Nile Tilapia (Oreochromis niloticus) Fingerlings. Pakistan Journal of Nutrition. 10(6): 568-571), of breeding chickens and laying hens (Esonu, B. O., Ogbonna, U. D., Anyanwu, G. A., Emelanom, O. O., Uchegbu, M. C., Etuk, M. C., & Udedibe, A. B. I. 2006. Evaluation of Performance, Organ Characteristics and Economic Analysis of Broiler Finisher Fed Dried Rumen Digesta. Int. J. Poult. Sci. 5:1116-1118), Odunsi, A. A. (2003). Blend of bovine blood and rumen digesta as a replacement for fishmeal and groundnut cake in layer diets. Inter. J. Poult. Sci. 2 (1): 58-61), and also of rabbits (Dairo, F. A. S, Aina O. O., Asafa, A. R. 2005. Performance evaluation of growing rabbits fed varying levels of rumen content and blood rumen content mixture. Nig. J. Anim. Prod. 32(1): 67-72 Okpanachi, U., Aribido, S. O., Daikwo, I. S. 2010. Growth and haematological response of growing rabbits to diets containing graded levels of sun dried bovine rumen content. African Journal of Food, Agriculture, Nutrition and Development. 10: 4444-4457).

The role of functional foods has been studied in dogs (Canis lupus familiaris) and in cats (Felis catus) (Swanson, K. S., Schook L. B., Fahey Jr. G. C. (2003). Nutritional genomics: implications for companion animals J. Nutr., 133, 3033-3040). Today, many diets for domestic carnivores (e.g. feeds for dogs and cats) and for wild carnivores (e.g. Cheetah) are enriched with plant-derived fibres for their beneficial effects on food intake, appetite and intestinal health (Fahey, J. W., Dinkova-Kostova, A. T., Talalay P. (2004). The "Prochaska" microtiter plate bioassay for inducers of NQO1. Chapter 14 in Methods in Enzymology, Vol. 382, Part B, pp. 243-258 (Eds.) H. Sies & L. Packer, Elsevier Science, San Diego, CA). However, the natural diet of an obligate carnivore rarely includes plant fibres and is characterized by a high protein content and a low carbohydrate level (Plantinga, E. A., Bosch G., Hendriks E. H. 2011. Estimation of the dietary nutrient profile of free-roaming feral cats: possible implications for nutrition of domestic cats. Br. J. Nutr., 106, S35-S48. Bosch, G., Hagen-Plantinga, E. A., Hendriks, W. H. 2015. Dietary nutrient profiles of wild wolves: insights for optimal dog nutrition? Br. J. Nutr. 113, S40-S54).

Despite the high adaptability of the gut microbiota to dietary changes, some evolutionary adaptations have remained unchanged. The domestic cat and the domestic dog belong to the order of carnivores and their ancestral counterparts lived mainly or entirely on captured prey animals. As a result, they have developed a series of evolutionary adaptations designed to facilitate the capture, killing, mauling, chewing, digestion and absorption of animal tissues. In these animals, the intestinal tract is shorter and has digestive enzymes and intestinal flora that are different from those of herbivores.

Both dogs and cats are characterised by a lack of salivary amylase and are unable to synthesise vitamin D and digest cellulose (NRC—National Research Council, "Carbohydrates and Fiber: Nutrient Requirements of Dogs and Cats," National Academies Press, Washington, DC, USA, 2006, pp. 49-80). In these carnivores, the digestion of cellulose and other higher polysaccharides is lower than that in rabbits, horses and ruminants, where the products of microbial degradation of polysaccharides are not sugars but mainly short-chain volatile fatty acids (SCFA). SCFA are absorbed and contribute to energy supply, and the bacterial action in the large intestine can synthesise vitamin B, which can be absorbed and utilised by the host. However, the synthesis of most of the vitamins in the digestive tract in the dog and cat is insufficient for daily requirement, so it is necessary for them to take it from a dietary source. In carnivorous and omnivorous animals, the final waste material of digestion (faeces), emptied from the large intestine, consists of water, undigested food residues (mostly from some fibre fractions), digestive secretions, epithelial cells of the gastrointestinal tract, inorganic salts, bacteria and products of microbial decomposition. Starting from about 33,000 years ago, dogs were domesticated by wolves (Ovodov, N. D., Crockford, S. J., Kuzmin, Y. V., Higham, T. F., Hodgins, G. W., van der Plicht J. 2011. A 33,000-year-old incipient dog from the Altai mountains of Siberia: Evidence of the earliest domestication disrupted by the last glacial maximum. PLoS ONE. 6:57; Skoglund, P., Ersmark, E., Palkopoulou, E., Dalén, L. 2015. Ancient wolf genome reveals an early divergence of domestic dog ancestors and admixture into high-latitude breeds. Curr. Biol. 25:1515-1519). These ancestral dogs were only partially dependent on human food scraps. Consequently, behavioural and physiological adaptations to a more varied diet, including the use and digestion of plant-based foods, were necessary to enable ancestral dogs to develop and achieve evolutionary success. Compared to carnivorous wolves, modern dogs are omnivores and have developed a superior ability to metabolise carbohydrates and survive on a low-protein diet (Buff, P. R., Carter, R. A., Bauer, J. E., Kersey, J. N. 2014. Natural pet food: A review of natural diets and their impact on canine and feline physiology. J. Anim. Sci. 92:3781-3791). Biochemical adaptations that facilitate this passage include increased gene expression for pancreatic amylase, the ability of converting maltose into glucose and increased intestinal uptake of glucose. The cat was instead domesticated about 10,000 years ago (Driscoll, C. A., Menotti-Raymond, M., Roca, A. L., Hupe, K., Johnson, W. E., Geffen, E., Harley, E. H., Delibes, M., Pontier, D., Kitchener, A. C., et al. 2007. The Near Eastern origin of cat domestication. Science. 317:519-523) and have been playing a slightly different role. In addition to being used as a companion animal, the cat was used to hunt animals considered as parasites like mice (Driscoll, C. A., Macdonald, D. W., O'Brien, S. J. 2009. From wild animals to domestic pets, an evolutionary view of domestication. Proc. Natl. Acad. Sci. USA. 106:S9971-S9978). Even today, domestic cats are well known for their predilection, in many cases, to continue hunting and killing wild animals. Consequently, the selective pressure on cats to adapt to eating mixed human food scraps could have been less than that applied to dogs, and has also been applied for a significantly shorter duration.

Commercial diets commonly include body parts from cows, sheep, pigs, turkeys, ducks, chickens, fish and shrimps; some of which have been labelled as unfit for human consumption; cow's milk is also commonly fed to cats, although some of them, like humans, are lactose intolerant and consequently exhibit intestinal signs such as diarrhoea. In contrast, the natural diet of wildcats consists mainly of small whole mammals, birds, fish, reptiles and invertebrates. Wild dogs are known to hunt in packs, similar to wild canids, and eat a wide variety of foods (Buff, P. R., Carter, R. A., Bauer, J. E., Kersey, J. N. 2014. Natural pet food: A review of natural diets and their impact on canine and feline physiology. J. Anim. Sci. 92:3781-3791).

In both canids and felids, most of the fibres and plant material consumed in the wild are metabolically different from the high glycaemic index carbohydrates found in commercial dry diets. Natural raw meat diets have a much lower glycaemic index, which helps reduce insulin resistance, inflammation and post-oxidative stress. Cats, in particular, do not consume adequate amounts of proteins, taurine, niacin, arachidonic acid and vitamins A, B1 and B12 in the current commercial prey-free diet, and are therefore predisposed to risk of eye and skin diseases, blood clotting disorders, immune system dysfunctions, poor growth, weight loss, diarrhoea and neurological disorders (MacDonald, M. L., Rogers Q. R., Morris, J. G. 1984. "Nutrition of the Domestic Cat, A Mammalian Carnivore" Annual Review of Nutrition. 4, 521-562).

The habit of carnivorous predators to eat whole prey allows the intake of fibre from the plant component contained in the gastrointestinal tract of the prey, in the form of predigested enzyme material, and also the intake of so-called "animal fibre" (Depauw, S., M. Hesta, K. Whitehouse-Tedd, L. Vanhaecke, A. Verbrugghe, and G. P. J. Janssens. 2013. Animal fibre: The forgotten nutrient in strict carnivores? First insights in the cheetah. J. Anim. Physiol. Anim. Nutr. (Berl). 97:146-154. Depauw, S., Bosch, G., Hesta, M., Whitehouse-Tedd, K., Hendriks, W. H., Kaandorp, J., Janssens, G. P. 2012. Fermentation of Animal Components in Strict Carnivores: A Comparative Study with Cheetah Fecal Inoculum. Journal of Animal Science. 90(8): 2540-2548).

This material (hair, feathers, scales, bones, etc.) is rich in glycoproteins that are barely or not digestible, and shows similarities to the fibres of plant origin in terms of fermentation potential. The fibre of plant origin is an important component of dog's and cat's commercial foods, given the low cost compared to other ingredients. High amounts of this fibre have been touted as an effective treatment for diarrhoea because, when consumed, it tends to slow down digestion and give more volume to stools. This is due to its tendency to attract water and form a gel. However, a high fibre content may also reduce the secretion of pancreatic enzymes necessary for protein digestion (Isaksson, G., Lundquist, I., Ihse I. 1982. "Effect of Dietary Fiber on Pancreatic Enzyme Activity in Vitro," Gastroenterology 82, 5. 1). Cats have a lower amount of pancreatic enzymes than other mammals, so a high amount of fibre in their diet results in less uptake and assimilation of nutrients. In ruminants, forages and fibrous roughage consist mainly of polysaccharides such as cellulose, which cannot be broken down by the digestive enzymes of mammals. Thus, ruminants have developed a special digestion system that involves microbial fermentation of the food before it is exposed to their digestive enzymes. In the rumen, food is partially fermented to produce mainly volatile fatty acids, microbial cells, methane gas and carbon dioxide. Gases are lost by belching and volatile fatty acids are mainly absorbed through the rumen wall. Microbial cells and undegraded dietary components pass into the abomasum and small intestine, where they are digested and the products of digestion are absorbed. In the large intestine and cecum, volatile fatty acids produced in the intestine are absorbed and microbial cells are excreted—together with undigested dietary components—in the faeces. The rumen-reticulum provides a continuous culture system for anaerobic bacteria, protozoa and fungi. This normal flora (bacteria) and fauna (protozoa) of the rumen becomes stable very early in life, as early as 6 weeks of age in calves.

In ruminants, protozoa include different types such as *Dasytricha ruminantium, Isotricha prostoma* and *Entodinium*. The bacteria belong to over 200 identified species and are present in a number of $10^9$-$10^{11}$ per millilitre of ruminal content. Most of these bacteria are non-spore-forming anaerobes and also represent the most important species/genera observed at high concentrations in the gastrointestinal tract of healthy carnivores (Wernimont, S. M., Radosevich, J., Jackson, M. I., Ephraim, E., Badri Dayakar, V., MacLeay, J. M., Jewell Dennis, E., Suchodolski, J. S. 2020. The Effects of Nutrition on the Gastrointestinal Microbiome of Cats and Dogs: Impact on Health and Disease. Frontiers in Microbiology. 11:1266).

Table 1 lists some of the most important species and indicates the substrate they use and the final products of fermentation. This information is based on studies of isolated species in vitro.

Cellulolytic bacteria in ruminants play a fundamental role in the use of feeds not suitable for monogastric animals and in facilitating the survival of ruminant and herbivorous animals when these are fed fibrous and poor quality fodder. During the fermentation process, the energy is released in the form of adenosine triphosphate (ATP), which is used to fuel various activities of the ruminal microbiota. This energy can be improved in ruminants by supplementing the animals' diet with dietary fats, an approach that is commonly practised. The role of fungi in the rumen has yet to be fully characterised. They are strict anaerobes, can use most polysaccharides and many soluble sugars; and it is known that they are more numerous (making up 10% of the microbial biomass) when the diets are rich in fibres (i.e. not diets based on cereals or young pasture grasses).

TABLE 1

| Species | Substrate * | Products¶ |
|---|---|---|
| *Fibrobacter succinogenes* | A | F, A, S |
| *Ruminococcus albus* | C, X | F, A, E, H, C |
| *Ruminococcus flavefaciens* | C, X | F, A, S, H |
| *Butyrivibrio fibrisolvens* | C, X, PR | F, A, L, B, E, H, C |
| *Clostridium lochheadii* | C, PR | F, A, B, E, H, C |
| *Streptococcus bovis* | A, S, SS, PR | L, A, F |
| *Ruminobacter amylophilus* | A, P, PR | F, A, S |
| *Prevotella ruminocola* | A, X, P, PR | F, A, P, S |
| *Succinimonas amylolytica* | A, D | A, S |
| *Selenomonas ruminantium* | A, SS, GU, LU, PR | A, L, P, H, C |
| *Lachnospira multiparus* | P, PR, A | F, A, E, L, H, C |
| *Succinivibrio dextrinosolvens* | P, D | F, A, L, S |
| *Methanobrevibacter ruminantium* | M, HU | M |
| *Methanosarcina barkeri* | M, HU | MC |
| *Treponema bryantii* | P, SS | F, A, L, S, E |
| *Megasphaera elsdenii* | SS, LU | A, P, B, V, CP, H, C |
| *Lactobacillus* sp. | SS | L |
| *Anaerovibrio lipolytica* | L, GU | A, P, S |

TABLE 1-continued

| Species | Substrate * | Products¶ |
|---|---|---|
| *Eubacterium ruminantium* | SS | F, A, B, C |
| *Oxalobacter formigenes* | O | F, C |
| *Wolinella succinogenes* | HU | S, C |

C = cellulolytic;
X = xylanolytic;
A = amylolytic;
D = dextrinolytic;
P = pectinolytic;
PR = proteolytic;
L = lipolytic;
M = methanogenic;
GU = glycerol user;
LU = lactate user;
SS = main fermenter of soluble sugar,
HU = hydrogen user;
O = oxalate degrader;
F = formate;
A = acetate;
E = ethanol;
P = propionate;
L = lactate;
B = butyrate;
S = succinate;
V = valerate;
CP = caproate;
H = hydrogen;
C = carbon dioxide;
M = methane Nowadays, the oral use of probiotics is widespread. However, the safety profile of the use of live probiotics is still a matter of debate. The main risks include: i) cases of systemic infections due to translocation, particularly in vulnerable immunocompromised patients and young/old animals; ii) acquisition of antibiotic resistance genes; iii) interference with intestinal colonisation in neonates. To avoid these risks, there is growing interest in the use of non-viable microorganisms or microbial cell extracts, mainly heat-killed probiotic bacteria (including tyndallized bacteria) (lactic acid bacteria and bifidobacteria and/or other strains). Heat-treated probiotic cells, cell-free supernatants and purified key components are able to confer beneficial effects, mainly immunomodulatory effects, protection against enteropathogens and maintenance of intestinal barrier integrity. These treatments on bacterial suspensions may use a temperature range comprised between 70 and 100-C and in some cases inactivation is achieved by a combination of heat treatments interspersed with incubation periods at lower temperatures, a process known as tyndallization, due to similarities with the sterilisation method developed by Tyndall during the nineteenth century (Kim, H., Kim, H., Bang, J., Kim, Y., Beuchat, L. R., Ryu, J. H. 2012. Reduction of *Bacillus cereus* spores in sikhye, a traditional Korean rice beverage, by modified tyndallization processes with and without carbon dioxide injection. Lett. Appl. Microbiol. 55:218-223; Daelemans, S., Peeters, L., Hauser, B., Vandenplas, Y. 2018. Recent advances in understanding and managing infantile colic. F1000Res. 7:F1000). After inactivation of the bacteria, mainly by heat treatment, the dead cells can release bacterial components with key immunomodulatory properties and effects against pathogens. It has been proposed that different bacterial components, such as lipoteichoic acids, peptidoglycans or exopolysaccharides (EPS), are mainly responsible for these properties in preparations containing heat-killed bacteria (Taverniti, V., Guglielmetti, S. 2011. The immunomodulatory properties of probiotic microorganisms beyond their viability (ghost probiotics: Proposal of paraprobiotic concept). Genes Nutr.

6:261-274; Castro-Bravo, N., Wells, J. M., Margolles, A., Ruas-Madiedo, P. 2018. Interactions of Surface Exopolysaccharides From *Bifidobacterium* and *Lactobacillus* Within the Intestinal Environment. Front. Microbiol. 9:2426). Numerous studies have shown the benefits of these bacterial components in different situations, for example in neonates, without incurring the risks associated with the use of live microorganisms (Stahler Burta, O., Iacobescu, C., Mateescu, R. B., Nicolaie, T., Tiuca N., Pop, C. S. 2018. Efficacy and safety of APT036 versus simethicone in the treatment of functional bloating: A multicentre, randomised, double-blind, parallel group, clinical study. Transl. Gastroenterol. Hepatol. 3:72. Deshpande, G., Athalye-Jape, G., Patole, S. 2018. Para-probiotics for Preterm Neonates. Next. Front. Nutr. 10:E871), and with pharmaceutical advantages in terms of transport and storage. After heat treatment, the industrially cultivated probiotic bacteria retain their main probiotic properties, thus allowing the development of safer preparations with more optimal pharmaceutical properties (Canducci, F., Armuzzi, A., Cremonini, F., Cammarota, G., Bartolozzi, F., Pola, P., Gasbarrini, G., Gasbarrini, A. 2000. A freeze-dried and inactivated culture of *Lactobacillus acidophilus* increases *Helicobacter pylori* eradication rates. Aliment. Pharmacol. Ther. 14:1625-1629; Lee, S. H., Yoon, J. M., Kim, Y. H., Jeong, D. G., Park, S., Kang, D. J. 2016. Therapeutic effect of tyndallized *Lactobacillus rhamnosus* IDCC 3201 on atopic dermatitis mediated by down-regulation of immunoglobulin E in NC/Nga mice. Microbiol. Immunol. 60:468-476). In addition, tyndallization and other heat treatments can lead to the breakdown of cell walls, with the release of cytoplasmic contents (bacterial lysates), such as DNA and cell wall components (i.e. peptidoglycans, lipoteichoic acids or thermolabile pili). The released bacterial components can inhibit pathogens by competition, adhesion and colonisation and may have an immunomodulatory role. It has recently been shown that the degradation and the lysis of bacteria by lysozyme increases the release of bacterial products, including peptidoglycan, which activate innate immunity receptors (PRR) in host cells, a process that is important for the resolution of inflammation at mucosal sites (Ragland, S. A., Criss, A. 2017. From bacterial killing to immune modulation: Recent insights into the functions of lysozyme. PLoS Pathog. 13:e1006512). These specific components are usually active on Toll-like receptors and on other signal transduction receptors in the intestinal epithelium, dendritic cells and other intestinal immune cells. Recently, medical devices containing different tyndallized strains in combination with fibre-derived mucosal protectors, such as xyloglucan or gelatine tannate, have been marketed for the treatment of colic in children and adults (i.e. xyloglucan plus tyndallized strains of *L. reuteri* and *B. breve*) and for the treatment/prevention of diarrhoea, (i.e. xyloglucan plus tyndallized strains of *L. reuteri* and *B. breve*) and for the treatment/prevention of diarrhoea due to intestinal dysbiosis (i.e. gelatine tannate plus tyndallized *Lactobacillus acidophilus*, *L. plantarum*, *L. casei*, *L. rhamnosus*, *Bifidobacterium bifidum* and *Streptococcus thermophilus*).

In clinical practice, the products containing tyndallized probiotic strains have played a significant role in gastrointestinal diseases, including infantile bloating and colic and diarrhoea, or in the management of allergic dermatological or respiratory diseases. The literature data reviewed indicates that heat-killed bacteria, or their fractions, or purified components, have key probiotic effects, with advantages over live probiotics, primarily with regards to their safety profile.

According to the World Gastroenterology Organisation's Global Guidelines, prebiotics are non-digestible substances taken by the host that, in adequate amounts, produce beneficial physiological effects by stimulating the growth and the metabolic activity of a limited number of beneficial indigenous bacteria such as bifidobacteria and lactic acid bacteria. Prebiotics are the main dietary components of foods, mostly non-starch polysaccharides and oligosaccharides, used as enrichment ingredients. The most commonly known and characterised prebiotics include supplements of fructo-oligosaccharides (FOS), galacto-oligosaccharides, inulin, lactulose and oligosaccharides from breast milk (Roberfroid, M. B. 2007. Prebiotics: The concept revisited. J. Nutr. 137(2): 830S7S; Macfarlane, G. T., Steed, H., Macfarlane, S. 2008. Bacterial metabolism and health-related effects of galacto-oligosaccharides and other prebiotics. J. Appl. Microbiol. 104, 305-344). These substances are often included in symbiotic formulations containing probiotic bacteria in order to promote their rapid growth in the intestinal environment. FOS are able to cross the digestive lumen, undigested and unabsorbed, to reach the ascending colon unmodified, where they will be selectively metabolised by the resident probiotic component of the microbiota. Their digestion causes a significant decrease in pH, creating an unfavourable habitat for the growth of putrefactive bacteria (clostridia).

Recently, studies carried out thanks to the technique known as "Fecal Microbiota Transplants" (FMT) (a technique that has many conceptual points in common with our invention, being characterised in that the microbial-probiotic enrichment of the recipient's intestine is carried out by directly transplanting faecal material, including pro- and prebiotic faecal fractions, from a healthy donor) show that, after the antibiotic therapy, the FMT technique responds much better and much more easily in restoring the original microbiota of the recipient (who has been treated with antibiotics). In these studies carried out on a group of human subjects testing the use of probiotics as a microbial enhancer after the use of antibiotics, it was observed that antibiotics can wipe out large populations of bacteria from the gut (Suez J., Zmora N., Zilberman-Schapira G., Mor U., Dori-Bachash M., Bashiardes S., Zur M., Regev-Lehavi D., Ben-Zeev Brik R., Federici S., Horn M., Cohen Y., Moor A E., Zeevi D., Korem T., Kotler E., Harmelin A., Itzkovitz S., Maharshak N., Shibolet O., Pevsner-Fischer M., Shapiro H., Sharon I., Halpern Z., Segal E., Elinav E. Post-Antibiotic Gut Mucosal Microbiome Reconstitution Is Impaired by Probiotics and Improved by Autologous FMT. Cell, 2018; 174 (6): 1406 DOI: 10.1016/j.cell.2018.08.047).

Another study examined the gut microbiomes of a group of individuals using a probiotic supplement to see how much of the probiotic could actually be retained by the human gut. The study used the most common probiotic strains on the market. A two-month follow-up was performed and compared with their baseline intestinal composition before the probiotics. The results showed that the colonisation of probiotic bacteria in the gut occurred in only half of the test subjects. They called those who were successfully colonised the "persistent" and those who were not, the "resistant" (Zmora N., Zilberman-Schapira G., Suez J., Mor U., Dori-Bachash M., Bashiardes S., Kotler E., Zur M., Regev-Lehavi D., Ben-Zeev Brik R., Federici S., Cohen Y., Linevsky R., Rothschild D., Moor A E, Ben-Moshe S., Harmelin A., Itzkovitz S., Maharshak N., Shibolet O., Shapiro H., Pevsner-Fischer M., Sharon I., Halpern Z., Segal E., Elinav E. Personalized Gut Mucosal Colonization Resistance to

9

10

Empiric Probiotics Is Associated with Unique Host and Microbiome Features. Cell, 2018; 174 (6): 1388 DOI: 10.1016/j.cell.2018.08.041).

The supplementation of prebiotics and dietary fibres has been a major focus of research into dietary strategies to support gut health in human and animal nutrition. The applications of pro- and prebiotics in companion animals and their exploitation on farm animals in aquaculture are still under study. The administration of prebiotics has been shown to be beneficial on young ruminants (Uyeno Y, Shigemori S, Shimosato T (2015) Effect of probiotics/ prebiotics on cattle health and productivity. Microbes Environ 30(2):126-132); in poultry, by increasing the volume of chicken faeces and modulating the gut microbiota through inhibition of pathogenic bacteria (Totton S C, Farrar A M, Wilkins W, Bucher O, Waddell L A, Wilhelm B J, McEwen S A, Rajic A (2012) The effectiveness of selected feed and water additives for reducing Salmonella spp. of public health importance in broiler chickens: a systematic review, meta-analysis, and meta-regression approach. Prev Vet Med 106(3-4):197-213. https://doi.org/10.1016/j. prevetmed.2012.07.007); in aquaculture, as immunostimulants (Akhter N, Wu B, Memon A M, Mohsin M (2015) Probiotics and prebiotics associated with aquaculture: a review. Fish Shellfish Immunol 45(2):733-741. https://doi.org/10.1016/ j.fsi.2015.05.038). Dietary fibres like prebiotics and probiotics play a key role in the health of companion animals by influencing the immune response and the profile of the gut microbiota, modulating gut motility, but also as potential adjunctive therapies against enteropathogens, reducing caloric concentration, reducing the incidence of obesity and consequently diabetes mellitus. In a study carried out in 2019, the role of prebiotic fibre in healthy adult dogs was demonstrated. A significant effect on faecal metabolites has been demonstrated, indicating a potentially improved microbial pathway, with beneficial changes in faecal fermentation final products, intestinal health, increased short-chain faecal fatty acids and decreased branched-chain phenols and indoles, fatty acid concentration and ammonia concentration (Nogueira, J., He, F., Mangian, H. F., Oba, P. M., & De Godoy, M. (2019). Dietary supplementation of a fiber-prebiotic and saccharin-eugenol blend in extruded diets fed to dogs. Journal of animal science, 97(11), 4519-4531 https://doi.org/10.1093/jas/skz293).

Clinical studies have shown the effect of symbiotic supplementation in dogs and cats with diarrhoea (Matthewman L, Allenspach K. Pre and probiotics—Practical applications for VNs in practice. VN Times 2013; 13:8-9; Schmitz S, Suchodolski J. Understanding the canine gut microbiota and its modification by pro-, pre- and synbiotics—what is the evidence? Vet Med Sci 2016; 2:71-94; Rose L, Rose J, Gosling S, Holmes M. Efficacy of a Probiotic-Prebiotic Supplement on Incidence of Diarrhea in a Dog Shelter: A Randomized, Double-Blind, Placebo-Controlled Trial. J Vet Intern Med. 2017 March; 31(2):377-382. doi: 10.1111/jvim.14666. Epub 2017 Feb. 10. PMID: 28186660; PMCID: PMC5354029), supporting the hypothesis that supplementing dogs with a symbiotic reduces the incidence of diarrhoea and provides evidence of a beneficial effect. It has also been shown that the pre- and probiotics are a valuable aid if used to treat infectious or dietary-based diarrhoea; to boost specific immune functions in puppies and their immune response to vaccination or in dogs genetically predisposed to developing atopic dermatitis (Herstad H K, Nesheim B B, L'Abée-Lund et al (2010). Effects of a probiotic intervention in acute canine gastroenteritis—a controlled clinical trial, J Small Anim Pract 51 (1): 34-38;

Benyacoub J, Czarnecki-Maulden G L, Cavadini C et al (2003). Supplementation of food with Enterococcus faecium (SF68) stimulates immune functions in young dogs, J Nutr 133: 1,158-1,162. 7; Marsella R, Santoro D and Ahrens K (2012). Early exposure to probiotics in a canine model of atopic dermatitis has long-term clinical and immunological effects, Vet Immunol Immunopathol 15; 146 (2): 185-189). In cats, the probiotics have been found to be a potential supplement to combat enteropathogens such as Giardia duodenalis and Tritrichomonas fetus (Rachel Dickson, Julie Vose, David Bemis, Maggie Daves, Thomas Cecere, Jody L. Gookin, Joerg Steiner, M. Katherine Tolbert. The effect of enterococci on feline Tritrichomonas foetus infection in vitro, Veterinary Parasitology, Volume 273, 2019, Pages 90-96, ISSN 0304-4017). Soluble fibres have been shown to modulate glycaemia and insulinemia in pathological conditions such as diabetes mellitus and obesity. These studies suggest a possible modulation of glucose metabolism through stimulation of gluconeogenesis by propionate, which may be useful in the treatment of insulin resistance and feline diabetes (Verbrugghe, A., Hesta, M., Gommeren, K., Daminet, S., Wuyts, B., Buyse, J., & Janssens, G. (2009). Oligofructose and inulin modulate glucose and amino acid metabolism through propionate production in normal-weight and obese cats. British Journal of Nutrition, 102(5), 694-702. doi:10.1017/S0007114509288982; Massimino, SP, McBurney, MI, Field, C J, et al. (1998) Fermentable dietary fibre increases GLP-1 secretion and improves glucose homeostasis despite increased intestinal glucose transport capacity in healthy dogs. J Nutr 128, 1786-1793; Hesta, M, Debraekeleer, J, Janssens, G P J, et al. (2001) The effect of a commercial high fibre diet and an iso-malto-oligosaccharide supplemented diet on postprandial glucose concentrations in dogs. J Anim Physiol Anim Nutr 85, 217-221). In nature, the nutrition of carnivores, particularly big cats, is not focused only on ingesting the muscle component of the carcass. Numerous studies have shown that in captivity, a balanced diet is difficult for these animals to replicate. Wild cheetahs eat not only muscle meat, but also internal organs of the preys such as fat, bones and connective tissue to meet their needs for minerals, vitamins and fatty acids. Their natural prey consists mainly of small ruminants (antelopes). The microorganisms in the rumen are able to convert polyunsaturated fatty acids (PUFA) and the monounsaturated fatty acids (MUFA) into saturated fatty acids, which are incorporated into their fat reserves. In wild cheetahs, SFA: MUFA and SFA:PUFA ratios are higher than in captive cheetahs (Tordiffe, A. S. W., et al., (2016). Comparative serum fatty acid profiles of captive and free-ranging cheetahs (Acinonyx jubatus) in Namibia. PLoS ONE 11(12): e0167608; Whitehouse-Tedd, K. M., Lefebvre, S. L., and G. P. J., Janssens, (2015). Dietary Factors Associated with Faecal Consistency and Other Indicators of Gastrointestinal Health in the Captive Cheetah (Acinonyx Jubatus). PLoS ONE 10(4): e0120903). In captivity, the diet of these carnivores is composed of animals that are fed whole, i.e. with the stomach (carcasses of rabbits, horses, pigs, chickens) which have higher percentages of MUFA and PUFA. In conclusion, the supplementation of the diet with prebiotics and animal fibers, such as those contained in our "invention", could also be beneficial in the big cats kept in captivity, in particular in the cheetah predisposed to chronic diseases (Lane, E. P., Miller, S., Lobetti, R., Caldwell, P., Bertschinger, H. J., Burroughs, R., Kotze, A. and A. van Dyk, (2011). Effect of diet on the incidence of and mortality owing to gastritis and renal disease in captive cheetahs (Acinonyx jubatus) in South Africa. Zoo Biology, 31(6):

669-682; Terio, K. A., Munson, L. and P. F. Moore, (2012). Characterization of the gastric immune response in cheetahs (*Acinonyx jubatus*) with *Helicobacter*-associated gastritis. Vet Pathol, 49(5): 824-33).

Technical Problem

In light of the state of the art, although many studies do not encourage feeding cattle only with ruminal digestate, but rather its supplementation with other feed ingredients at a recommended dose during feed formulation (Elfaki, M. O. A., Abdelatti, K. A., Malik, H. E. E. 2014. Effect of Dietary Dried Rumen Content on Broiler Performance, Plasma Constituents and Carcass Characteristics. Glob. J. Anim. Sci. Res. 3, 264-270.11; Togun, V. A., Farinu, G. O., Ojebiyi, O. O., Awotunde, A. I. 2010. Effect of Replacing Maize with a Mixture of Rumen Content and Blood Meal on the Performances of Growing Rabbits: Initial Study with Mash Feed. World Rabbit Sci. 17, 21-265), the inventors of the present invention have developed a biologically safe probiotic and a prebiotic dietary supplement derived from the colic/caecal and ruminal contents from ruminants and rabbits known as digesta, which is a waste product of the livestock industry, prepared by means of a specific process which leads to the preparation of a final product with a high biological value being biologically safe, which has mainly a prebiotic effect, in which the probiotic and postbiotic effects derive from whole bacteria, but also from portions of bacteria, protozoa and yeasts contained in very high quantities and which show a symbiotic or synergistic effect between the fibrous component and the bacterial component. The product can be added to the daily ration mainly of dogs and cats, but also of all production animals, such as bovines, sheep, goats, rabbits, chickens and pigs. In most studies, the ruminal digestate was mixed with other feeds to add value, increase the palatability and improve the efficiency. The dietary supplement developed in the present invention has the prerogative of being complete, safe and functional.

The process for producing the product of the present invention makes it possible to retain intact all the nutritional principles of the starting material, such as short-chain volatile fatty acids, amino acids, vitamins, minerals, dietary fibre of various types, but above all containing a very high load of bacterial derivatives, protozoa and yeasts, which stimulate the immune system of the gastrointestinal tract of the animals.

The main risks to pets associated with feeding raw food are infectious diseases, particularly bacterial and parasitic diseases, and nutrient imbalance.

The process for producing the product of the present invention has been developed to ensure inactivation of the microbial component, which nevertheless retains its functionality.

The process developed in the present invention makes it possible to obtain a complementary foodstuff in freeze-dried form which is easy to use and odour-free. The present invention differs from the prior art in that the product of the present invention is biologically safe, retains all post-biotic effects, provides a strong prebiotic supplement for monogastrics, especially carnivores and omnivores, as well as a good prebiotic and dietary basis for herbivorous monogastrics and polygastric animals, which derives from the presence in the present invention of the whole fraction of dietary fibre in a predigested form, from the microbial flora with ruminal and/or caecal cellulosic fermentation.

OBJECT OF THE INVENTION

The technical problem is achieved by providing a composition comprising dry extract of ruminal content of bovine and sheep and caecal content of rabbit.

Another object of the present invention is the use of a composition comprising dry extract of ruminal content of bovine and sheep and caecal content of rabbit as a dietary supplement for animals.

The present invention also relates to a process for preparing a composition comprising dry extract of ruminal content of bovine and sheep and caecal content of rabbit comprising a first stage of tyndallization in batch mode, followed by an atomisation (spray drying) stage.

Another object of the present invention is a dietary supplement for animals comprising dry extract of ruminal content of bovine and ovine and caecal content of rabbit for use to stimulate the immune system.

Another object of the present invention is a dietary supplement for animals comprising dry extract of ruminal content of bovine and ovine and caecal content of rabbit for use for the treatment of pathologies selected in the group consisting of: dysbiosis, infections caused by enteropathogens, gastritis, diarrhoea, diabetes, chronic renal pathologies, atopic dermatitis, hepatic encephalopathy, inflammatory bowel disease (IBD), fibre reactive enteritis, antibiotic reactive enteritis, corticosteroid reactive enteritis, histiocytic colitis of the dog, chronic colonic dysmotility, chronic constipation of the cat, mucoid enterocolitis of the rabbit, porcine intestinal adenopathy, *Lawsonia intracellularis* disease of pigs, lactose malabsorption, necrotizing enteritis of the chicken, hepatic lipidosis syndrome, colic syndrome of the horse.

Further features and aspects of the present invention will be clear from the following detailed description with reference to the experimental results provided.

DETAILED DESCRIPTION OF THE INVENTION

The object of the present invention is a composition comprising dry extract of ruminal content of bovine and ovine and caecal content of rabbit.

Preferably the composition is: moisture 7.17%; dry matter 92.83%; crude protein 17.13%; ashes 7.49%; ether extract 2.81%; fat 1.10%; crude fibre 24.58%; nitrogen-free extract (NFE) 40.82%.

Another object of the present invention is the use of a composition comprising dry extract of ruminal content of bovine and ovine and caecal content of rabbit for animal dietary supplementation.

Another object of the present invention is a veterinary dietary supplement comprising dry extract of ruminal content of bovine and ovine and caecal content of rabbit for use to stimulate the immune system.

Another object of the present invention is a veterinary dietary supplement comprising dry extract of ruminal content of bovine and ovine and caecal content of rabbit for use for the treatment of pathologies selected in the group consisting of: dysbiosis, infections caused by enteropathogens, gastritis, diarrhoea, diabetes, chronic renal pathologies, atopic dermatitis, hepatic encephalopathy, inflammatory bowel disease (IBD), fibre reactive enteritis, antibiotic reactive enteritis, corticosteroid reactive enteritis, histiocytic colitis of the dog, chronic colonic dysmotility, chronic constipation of the cat, mucoid enterocolitis of the rabbit, porcine intestinal adenopathy, *Lawsonia intracellularis* disease of pigs, lactose malabsorption, necrotizing enteritis of the chicken, hepatic lipidosis syndrome, colic syndrome of the horse.

Infections caused by enteropathogens are preferably caused by gastric microorganisms similar to *Helicobacter, Giardia, Coccidia, Tritrichomonas.*

Preferably the composition is used as a complementary foodstuff in pets, in particular dogs and cats, bovines and/or cattle such as bovines, sheep, pigs, rabbits, chickens, fish and other farm and meat animals.

Preferably the composition is administered in a percentage of 30% over the total food to rabbits, of 20-30% over the total food to sheep, goats or cows, in a percentage between 5 and 10% over the total food to dogs and cats and in a percentage between 10 and 15% over the total food in chicken.

The present invention also relates to a process for preparing a composition comprising a dry extract of ruminal content of bovine and ovine and of caecal content of rabbit comprising a first stage of tyndallization in batch mode, followed by a second atomisation stage (spray drying).

Preferably the tyndallization stage is performed by heating to a temperature comprised between 70-100° C. and for a time comprised between 15 and 30 minutes, followed by incubation at room temperature for a period of 24 hours, repeated two or three times.

More preferably, the tyndallization stage includes three heating steps at 70° C. for a maximum of 30 minutes, interspersed with an incubation period of 24 hours.

Preferably, the atomisation stage (spray drying) comprises four successive steps in which the starting liquid product is atomised into a spray form, then the droplets generated by the spray are brought into contact with hot air to allow the evaporation of moisture and formation of dry solid particles, then the dry solid particles are separated from the air flow and collected.

More preferably the atomisation stage (spray drying), the atomisation of the starting liquid product into a spray is performed by means of an atomising device, then the droplets generated by the spray are subjected to the contact with heated air in a drying chamber, resulting in the evaporation of moisture and the formation of dry solid particles which are separated from the air flow and collected in a collection device.

Another object of the present invention is a composition comprising a dry extract of ruminal content of bovine and ovine and of caecal content of rabbit in which the dry extract is obtained by means of a process comprising a first stage of tyndallization in block mode (batch mode) followed by a second atomisation stage (spray drying).

Examples

The ruminal and caecal juice were divided into two batches. One of the two was directly subjected to the tyndallization process, the other was previously filtered with a large-mesh sieve to remove the large plant material and then subjected to the same tyndallization process.

Tyndallization is a fractional sterilisation method in which heating at temperatures of 70-100° C. is applied for 30 minutes in batch mode. A first heat treatment, which kills the vegetative forms, is followed by a 24-hour incubation period, which promotes spore germination. The thus treated material is again brought back to a temperature of 70-100° C. for 30 minutes, in order to kill the vegetative cells deriving from spore germination. This process should be repeated 2 or 3 times.

The tyndallization process produces bacterial cells with inactivated replication capacity and inactivated enzymatic capacity, while maintaining the cell structure and cell wall of the bacterial cells themselves unaltered. Therefore, the tyndallized bacterial cells can be defined as physiologically intact cells and, for this reason, they are immunologically active and maintain their specific immunostimulatory activity towards gut-associated lymphoid tissue (GALT).

The total microbial count and pH of the two sample batches were measured before and after each step of the tyndallization process. For the determination of the aerobic and anaerobic microbial counts, an aliquot of each of the two samples was serially diluted on base 10 and seeded in duplicate for counting on TSA, BHI and MRS medium. The media were incubated aerobically and anaerobically at 37° C. for 24-48 hours. The colonies were counted after incubation and UFC/mL were calculated. The microbial counts were transformed into logarithmic reduction using the equation: log (N/NO), where N is the concentration of microbial cells before the tyndallization process and NO is the concentration of microbial cells after tyndallization.

The tyndallization process of the present invention involved three heating steps at 70° C. for a maximum of 30 min, interspersed with a 24 hour-incubation period to allow the hollow spores to germinate.

Both batches of samples were immediately placed at −80° C. After 12 h of freezing, the samples were placed in the freeze-dryer (Lyovapor™ L-200, Buchi), with the trap already cooled for a period of 24 hours in automatic cycle. At the end of this freeze-drying period, the freeze-dried product was collected in plastic bags and subjected to subsequent analysis.

The atomisation process (spray drying) is carried out in an atomiser (spray dryer), which comprises a heater to heat the air; an atomiser for atomising the mixture to form microparticles; a drying chamber where the moist micro-particles come into contact with hot air, which evaporates the water in the micro-particles to generate dry powder; a cyclone separator to collect the powder; and a fan to discharge the spent air.

The spray drying technique enables dry powders with a low moisture content to be obtained starting from liquid products such as solutions, emulsions or suspensions. It is possible to obtain a final product with low water activity, ensuring microbiological stability, reduced weight and volume, and facilitating the storage, transport and marketing thereof.

The process comprises four stages. First, the liquid sample is converted into a spray by an atomising device. These small droplets are subjected to the contact with heated air in a drying chamber, resulting in the evaporation of moisture and the formation of dry solid particles. Finally, the solid particles are separated from the air flow and collected in a collection device.

Sample A was resuspended in ultra-pure water, washed and filtered through a small-mesh sieve to remove suspended solids. The filtered material (Sample C) was resuspended in ultra-pure water (3:1 ratio) and subjected to the spray drying process.

The ruminal/caecal juice was dried in a laboratory-scale BGchi Mini Spray Dryer B-290 (BGchi Laboratoriums-Technik) with a two-nozzle atomiser with an inner diameter of 0.7 mm and a 16 cm simultaneous drying chamber. The two solutions (ruminal and caecal) previously prepared (stirring at 40° C.) were inoculated into the chamber via a peristaltic pump with constant flow rate (9 mL/min). The drying air flow rate was kept at 100% and the compressed air flow rate at 450 L/h. The inlet air temperatures tested were 100 and 120° C. The outlet air temperature cannot be regulated, but is the result of the combination between inlet air temperature, feed speed, drying gas flow rate and content of solids of the feed. A single cyclone air separator system was used and the dried powders were collected from the base of the cyclone. Two replications were carried out for each experiment.

The analysis of the dried powders was carried out immediately after spray drying.

The drying yield was determined as the percentage ratio between the weight of the total mass of product collected and the initial amount of solids present in the solution inoculated into the spray dryer.

Water activity of the powders was determined using a water activity meter (Aqualab, 4TE, Decagon Devices Inc.) at a constant temperature of 23±1° C. Two readings were taken for each sample.

Optimising a drying process is the first step in finding the best conditions for a good quality powdered product. The different parameters evaluated to optimise the drying process of the ruminal/caecal content by spray drying were i) the content of soluble solids in the ruminal/caecal content and ii) the temperature of the air entering the spray dryer. Through the different tests carried out, the conditions that lead to the maximum drying yield and to the product with the lowest AW have been selected.

The freeze-dried ruminal or caecal content (ultra-small and large particulate preparations; 1 mg) was added to 1 ml of deproteinising solution (100 g/l metaphosphoric acid and 0.6 g/l crotonic acid) for the determination of volatile fatty acids (VFA). The VFA were determined in centrifuged samples (1 ml) as previously described (Carro et al., 1992). Approximately 10 ml of the sample were stored with 2-3 drops of toluene to prevent fermentation. The samples stored in this way were immediately analysed, or stored at a temperature of –20° C. pending analysis. For gas chromatographic (GC) analysis, the samples were prepared as follows: 200 μl of a mixture of metaphosphoric acid (25%) and formic acid (3:1) were added to 1 ml of liquid solution of the ruminal or caecal lyophilisate (Cottyn and Boucque, 1968). After 30 minutes of centrifugation, the supernatant was serially diluted on base 10 in water and injected into the chromatograph. The time sequence data of the VFA and NH3 concentrations in the liquid phase of the vessel were analysed at each sampling time. The sums of the squares were further partitioned through orthogonal contrasts in order to analyse the differences due to N shapes. The contrasts were distributed as follows: forms C1, NH3 v. NAN; C2, amino acids v. amino acids linked to peptides and C3, peptides v. Proteins. All analyses were carried out using the general linear models process of the Statistical Analysis Systems program (1985; Statistical Analysis Systems Inc., Cary, NC, USA). The short-chain fatty acids (SCFA) were determined also in another way: A) the rumen/caecal juice was analysed to determine the total content of free SCFA, including acetic (C2), propionic (C3), butyric (C4), valeric (C5), caproic (C6) acid and isomers, isobutyric (iC4), isovaleric (iC5) and isocaproic (iC6) acid. For the extraction of the analytes from each sample (100 mg wet weight), 200 μl of H2SO4 (50 w/v %) were added in order to have free SCFA in their undissociated form. Thereafter, ether was added to extract the SCFA (iC6 was added to the ethyl ether and used as an internal standard, 50 ppm) and vortexed and centrifuged to collect the supernatant. Fifty μl of each supernatant was injected into the gas chromatograph (GC) to perform the analysis. Gas chromatography is a technique consisting of a mobile phase, represented by a carrier gas (helium or nitrogen), and by a stationary phase consisting of a microscopic layer of liquid or polymer on an inert support inside a column. The gaseous compounds to be analysed interact with the column wall and are eluted at different times, called retention times of the compounds. Comparing the retention time with the detector response provides the analytes present in a sample at different times. Quantitative analysis was performed using a calibration curve, also known as a "standard curve", which helps calculate the concentration of the analytes in each sample. The curve was created to define the exact range of use, considering all the samples to be inserted. The interval selected was from 5 to 175 ppm, which indicated the concentrations of the different solutions used. The solutions used for the standard curve were injected into the gas chromatograph, as were the samples. The complete analysis of the content of fatty acids in the powder, i.e. in the final product or "invention", also included the determination of the content of fatty acids (FAs), such as palmitic (C16:0), palmitoleic (C16:1), stearic (C18:0), oleic (C18:1), linoleic (C18:2) and linolenic (C18:3) acid. From each sample, 5-10 mg (wet weight) of rumen/caecal powder were added to 1 ml of hexane and 0.1 ml of potassium hydroxide in methanol (KOH/CH3OH, 2N) to release the fatty acids and perform a transesterification. After this, 1.5 ml acetic acid (0.15 M) and 1 ml hexane were added and vortexed and centrifuged to collect the supernatant. One μl of each supernatant was injected into the gas chromatograph (GC), to perform gas chromatography as described above for the determination of the SCFA. The results of the analysis of the SCFA and FAs revealed that the composition of the invention (the final powder or coarser particulate matter) obtained from the spray drying process contained the same amount of SCFA and FA as the raw material (the raw ruminal and caecal fluid taken directly from the rumen and intestines of the animals at the slaughterhouse). Our tests have therefore established that the present invention retains the fat composition intact, thereby retaining the nutritional properties of the original fresh raw material.

The ruminal or caecal freeze-dried powder was analysed for amino acid (AA) and vitamin content. In particular, the powder belonging to the ruminal/caecal juice was analysed in an attempt to assess the total amount of N and the composition of AA. All samples were analysed by analysing their dry matter (DM) obtained after 6 hours at 105° C. and their ashes according to the AOAC method. 2005. Official Methods of Analysis. 18th edn. Association of Official Analytical Chemists; Arlington, VA, USA. The total N was determined using a combustion assay (Leco F P-528 N Analyzer, Leco Corp., St. Joseph, MI). The amino acid content of all samples was determined by HPLC after hydrolysis for 24 hours at 110° C. in a block heater. For all the AA, excluding Met, Cys and Trp, a sample containing 2 mg of N was weighed in hydrolysis tubes with 25 μL of norleucine 250 mM as internal standard. The samples were then hydrolysed, as described above, with high purity HCl 6 M (5 mL), after washing with N2 gas. For Met and Cys, additional aliquots containing 2 mg N and the internal standard were pre-oxidised with 1 mL performic acid (0.9 mL 88% formic acid, 0.1 mL 30% H2O2 and 5 mg phenol) for 16 h at 4° C. prior to acid hydrolysis. After hydrolysis, the contents of the tube were filtered through Whatman 541 filter paper (GE Healthcare Life Sciences, Marlborough, MA) and the filtrate was diluted to 50 mL in a volumetric flask with HPLC grade H2O. Aliquots of the sample (0.5 mL) were evaporated at 60° C. under constant flow with N2, with 3 rinses and re-evaporation with HPLC grade H2O, to remove acidic residues. After final evaporation, the hydrolysate was dissolved in 1 mL of Na diluent (Na220, Pickering Laboratories, Mountain View, CA). The single AA hydrolysates were separated using an Agilent 1100 series HPLC (Agilent Technologies, Santa Clara, CA) equipped with a sodium cation exchange column (Cat. No. 1154110T, Pickering Laboratories), using a 4-buffer phase gradient and a column temperature gradient. The separated AA were detected at 560 nm after post-column ninhydrin derivation. The standards (250 nmol/mL) for the single AA were prepared by diluting a pure standard in sample buffer. The volume of the sample and of the standards loaded on the column was 10 µL. For the determination of Trp, a separate aliquot of sample, containing 2 mg of N, was hydrolysed with 1.2 g of Ba(OH)2 at 110° C. for the same period of time as other AA, on a block heater. The hydrolysis included 125 µl of 5-methyl-Trp (5 mM) as an internal standard. After cooling in order to precipitate the barium ions, an aliquot (3 µL) of the hydrolysate was added to 1 mL of acetate buffer (0.07 M sodium acetate) and analysed by fluorescence detection (excitation=285 nm, emission=345 nm) after separation in HPLC.

Representative samples were analysed for dry matter (DM), crude protein (CP) and ether extract (EE) and ash content (AOAC, 2005). Nitrogen was determined according to the Kjeldhal method (Kjeldahl J. New Method for the Determination of Nitrogen. Chem. News 1883, 48 (1240), 101-102; Neue Methode zur Bestimmung des Stickstoffs in organischen K¨ orpern. Z. Anal. Chem. 1883, 22, 366-382; En ny Methode til Kvaelstofbestemmelsei organiske Stoeffer. Medd. Carlsberg Lab. 1883, 2 (1), 1-27; Sur une Nouvelle Methode de Dosage de l'Azote dans les Substances Organiques (French summary: R'esum'e du CR Trav. Lab. Carlsberg; separately paged section) 1883, 2 (Juni), 1-12e) the protein was calculated as N×6.25. The Neutral Detergent Fibre (NDF) was determined according to Van Soest (P. J. Van Soest, J. B. Robertson, B. A. Lewis, Methods for Dietary Fiber, Neutral Detergent Fiber, and Nonstarch Polysaccharides in Relation to Animal Nutrition, Journal of Dairy Science, Volume 74, Issue 10, 1991, Pages 3583-3597, ISSN 0022-0302), while the Acid Detergent Fiber (ADF) and the Acid Detergent Lignin (ADL) according to Van Soest and Robertson, 1985, (P. J. Van Soest, J. B. Robertson Analysis of forages and fibrous foods. AS 613 Manual Dep. Anim. Sci., Cornell Univ., Ithaca, NY (1985)—cit. in Van Soest, P. J., Robertson, J. B., & Lewis, B. A. (1991) J. Dairy Sci. 74, 3583-3597) using the Ankom Fiber Analyzer (Ankom Technology, 2005). The hemicelluloses were calculated as the difference between NDF and ADF and the cellulose as the difference between ADF and ADL contents.

For the estimation of the minerals, 1 g of dried sample was burned in a muffle furnace at 550° C. for 4 h. The ash was dissolved in hydrochloric acid and filtered on filter paper and the final volume was brought up to 250 ml with Milli-Q water (Millipore Corporation, Bedford, MA, USA). All minerals (i.e. Ca, P, Mg, Na, K, Cu, Fe, Mn, Zn) were estimated using an atomic absorption spectrophotometer. A specific lamp was used for each mineral and the atomic absorption spectrophotometer was calibrated with various concentrations of mineral standards. The standards and samples were placed and injected using the furnace's autosampler. For the Ca and Mg content to be determined, the treated samples were further diluted with lanthanum chloride to mask interference from other minerals.

According to Abalà-Hurtado et al. (AbalA-Hurtado S, Veciana-Nogués M T, Izquierdo-Pulido M, Mariné-Font A.

Determination of water-soluble vitamins in infant milk by high-performance liquid chromatography. J Chromatogr A. 1997 Aug. 22; 778 (1-2):247-53. doi: 10.1016/s0021-9673 (97)00387-7. PMID: 9299739) water-soluble vitamins were evaluated by the ion-pair HPLC method, which involves using a variable wavelength UV detector that allowed the determination of a wide range of water-soluble vitamins at their optimal wavelength of absorption: nicotinamide, pyridoxal, pyridoxine and pyridoxamine (vitamin B6), riboflavin (vitamin B2), thiamine (vitamin B1), cyanocobalamin (vitamin B12) and folic acid. With this rapid, simple and reliable liquid chromatographic method, it was possible to simultaneously determine nicotinamide, thiamine, riboflavin, pyridoxine, pyridoxal, pyridoxamine, cyanocobalamin and folic acid in liquid and powdered ruminal juice and in caecal/colon juice. Ion-pair chromatography with a reversed-phase C 18 column was used. Six vitamins were determined in a single analysis; the total analysis time never exceeded 55 min. A methanol-water mobile phase (15:85), 5 mM of octanesulfonic acid, with 0.5% of triethylamine at pH 3.6 and a flow rate of 1.0 ml/min are the conditions that provided the most satisfactory separation of these vitamins using a UV detector set at different wavelengths. Sample preparation involves acidification, to precipitate proteins, and centrifugation followed by gravity filtration. Linearity, precision, recovery and sensitivity have always been satisfactory. The limits of detection were comprised between 0.02 and 0.10 µg/ml and the limits of determination were comprised between 0.03 and 0.25 µg/ml. Vitamin A and vitamin E were also evaluated in the same matrices using a similar protocol. In particular, a high-performance liquid chromatographic method (HPLC) was applied for the one-run determination of retinol and alpha-tocopherol in liquid and powdered ruminal juice and in caecal/colon juice. The method involved saponification at room temperature and subsequent extraction of vitamins with n-hexane. Vitamins were determined using a reversed-phase C18 column and detected by UV spectrophotometry. Linearity, precision, recovery and sensitivity were satisfactory. The main advantage of the proposed method is the simultaneous determination of both vitamins using a common extraction process and the UV detection with a variable wavelength spectrophotometer.

The final composition of the present invention BAPPAS was: moisture 7.17%; dry matter 92.83%; crude protein 17.13%; ashes 7.49%; ether extract 2.81%; fat 1.10%; crude fibre 24.58%; nitrogen-free extract (NFE) 40.82% and 2278.50 Kcal/kg as estimated metabolic energy. In addition, the total population of bacteria, protozoa and yeasts was tyndallized but perfectly maintained in the above preparation, with the ability to exert all immunomodulatory activities along the GI tract of animals fed BAPPAS supplementation in their meal. On the basis of this composition (in particular on the basis of the fibre content which differs in the different species), we concluded by recommending the daily incorporation of atomised and tyndallized BAPPAS (belonging to bovine rumen content or rabbit caecal content), up to a supplementation level of 30% in the diet of the rabbit, between 20-30% in the diet of sheep, goats or cows and in a percentage between 5 and 10% in the diet of dogs and cats. The dried caecal digest of rabbit has been shown to contain: 18.20% moisture; 15.30% crude fibre; 18.52% crude protein; 7.60% ashes; 8.79% ether extract and 38.39% NFE. Based on this composition, a supplementation with a percentage comprised between 10 and 15% in the diet of the chicken, especially in broiler finishers, will induce better performance in terms of growth and immunomodulation (with better feed intake, optimisation of feed cost per kilogram of body weight gain, food conversion index and relative weight of the different organs of the animal).

The final composition of the invention may vary in terms of percentages of amino acid composition, but also in terms of fibre content (type of the different fibre components), amount of minerals and vitamins, percentage of bacteria, protozoa and yeasts, depending on the type of feed (composition of the dietary ration), cattle (bovines and sheep/goats) or rabbits from which the ruminal material or the caecal/colic starting material originates. Below are the values obtained by analysing the composition of the invention, based on the different batches of ruminal/caecal content from which extraction and spray drying were carried out. In particular, Table 2 shows the percentage composition of the product according to the various batches examined.

eters. The mechanisms underlying the immunomodulatory properties of probiotics are not fully understood but partly described in the introductory part of this patent. The mechanisms may be due to the ability of probiotics to balance the gut microbiota and/or be a consequence of a direct adjuvant effect on the production of immune factors, such as cytokines (Isolauri E, Sutas Y, Kankaanpaa P, Arvilommi H, Salminen S. Probiotics: effects on immunity. Am. J. Clin. Nutr. (2001) 73:444-450), and post-biotic release of immune factors by the ruminal flora. Stress and changes in diet are conditions that affect the intestinal microflora of dogs and for which our invention could be useful. Therefore, our invention (rumen and/or caecal content treated by means of the spray-dried technique and tyndallized) can improve health conditions in dogs exposed to stress and infections. Important changes in the microflora also occur during wean-

TABLE 2

| Test No. | Sample | DM % | CP % | EE % | CF % | ASH % | NFE % | NDF % | ADF % | Ca % | P % |
|---|---|---|---|---|---|---|---|---|---|---|---|
| 1 | Rumen | 92.64 | 18.26 | 7.94 | 24.99 | 14.47 | 39.67 | 78.00 | 55.73 | 0.77 | 0.65 |
| 2 | Rumen | 92.44 | 15.21 | 7.81 | 41.84 | 9.25 | 38.84 | 75.68 | 60.21 | 0.82 | 0.57 |
| 3 | Rumen | 91.37 | 18.53 | 7.78 | 28.28 | 9.25 | 35.97 | 78.71 | 54.52 | 0.7 | 0.69 |
| 4 | Cecum | 91.86 | 11.38 | 6.17 | 24.05 | 8.11 | 42.21 | 75.66 | 51.79 | 0.74 | 0.71 |
| 5 | Cecum | 90.50 | 12.82 | 4.69 | 30.86 | 8.83 | 45.36 | 76.12 | 52.45 | 0.7 | 0.59 |
| 6 | Colon | 81.84 | 18.52 | 8.79 | 15.33 | 7.54 | 39.56 | 59.21 | 36.68 | 0.81 | 0.66 |
| 7 | Colon | 80.78 | 19.02 | 8.81 | 18.27 | 6.42 | 40.26 | 57.36 | 38.00 | 0.79 | 0.64 | dry matter = DM;
crude protein = CP;
ether extract = EE;
crude fibre = CF;
incinerated residue = ASH;
nitrogen-free extract = NFE;
neutral detergent fibre = NDF;
acid detergent fibre = ADF;
Calcium = CA;
Phosphorus = P The total microbial count and pH of the two batches of samples were measured before and after each step of the tyndallization process. For the analysis of the aerobic and anaerobic microbial counts, an aliquot of each of the two samples was serially diluted on base 10 and seeded in duplicate for counting on TSA, BHI and MRS medium. The media were incubated aerobically and anaerobically at 37° C. for 24-48 hours. The colonies were counted after incubation and UFC/mL were calculated. The microbial counts were transformed into logarithmic reduction using the equation: $\log (N/N0)$, where N is the concentration of microbial cells before the tyndallization process and NO is the concentration of microbial cells after tyndallization.

The tyndallization process used involved three steps of heating at 70° C. for a maximum of 30 min separated by a 24-hour incubation period to allow the spores to germinate.

In order to evaluate the possible efficacy and the post-biotic effect, we carried out an "open" pilot study to assess the clinical and immunological effects of our invention (freeze-dried and tyndallized rumen content after treatment by spray-drying technique, derived from base material represented by mixed sheep and bovine rumen content) on healthy dogs [approved trial protocol (Certificate of Approval No. 3/2018) by the Ethical Committee of the DETO Department—Univ. of Bari, Italy]. Written informed consent was obtained from the owners for the participation of their animals in this study. We hypothesised that our invention, with pre- and post-biotic administration of mixed, freeze-dried and tyndallized ruminal material to healthy dogs, would modulate clinical and immunological paraming and the events that take place during this period of life can have a strong effect on the dog's general health throughout his life, particularly on the development of his immune system. Therefore, the rationale for adding our product to certain types of pet food, particularly for puppies, seems justified. Our aim was to test the safety and the palatability of our invention to stimulate the immune functions in dogs when our product is added to their standard diet. For this purpose (Materials and methods), twenty (20) clinically healthy dogs of different breeds were enrolled in the study. The enrolled dogs and their owners received written information about the methods and all owners gave written informed consent to participate in the study. All dogs had been wormed and vaccinated against rabies, distemper and hepatitis viruses and had never been treated with probiotics prior to the start of the trial. Ten dogs were randomly assigned to the control and treatment group, with equal distribution by sex. The test group (Group A) received a nutritionally complete, extruded commercial dry dog food (Maintenance dry dog food, Nutrix® Castelraimondo, Macerata (MC); 10% moisture, 23% protein, 8.5% fats, 2.5% fibre, 8% ashes, 14.2 kJ metabolisable energy/g) supplemented with our product. The "Invention" was added to the diet at a dose of 10% to meet the total weight of the meal on a daily basis. On the basis of the composition of the "Invention" (in particular based on the fibre content), we defined the protocol by recommending incorporation at this optimal rate in an attempt to also have a final bacterial concentration of $10^{10}$-$10^{11}$ cells/ml and over 200 species of freeze-dried bacteria (mainly belonging to the genera *Pre-*

*votella, Butyrivibrio* and Ruminococcus dominating the bacterial phyla) per dog, every day for 90 days. The dosage was based on the previous evaluation of the concentration in bacteria/organisms in our invention, per gram. The control group (Group B) received the same dry dog food without any additives. The dogs consumed water ad libitum and the food was offered for 20 minutes twice a day. To ensure that the administration of the "Invention" did not adversely affect the palatability of the food and for the health of the dogs to be promoted or maintained, food intake, body weight, body condition score (BCS, Nestlè Purina) and faecal scoring system (FSS, Nestle Purina) were monitored regularly, from the beginning (TO) to the end of the trial T8) (a total of 90 days, three months of administration of the composition of the present invention). Faecal samples were collected immediately after a spontaneous evacuation and frozen in liquid nitrogen for IgA assessment. As our invention was administered orally and was expected to act mainly at the mucosal level, secretory IgA was analysed in faeces. To measure IgA in stool samples, faeces from each dog (0.5 g) were collected and processed. The samples were taken every 2 weeks from $T_0$ to $T_8$, from all dogs, and IgA concentration was measured by ELISA, according to the previously published method (Rossi G., Pengo G., Galosi L., Berardi S., Tambella A M, Attili A R, Gavazza A, Cerquetella M, Jergens A E., Guard B C., Lidbury J A., Stainer J M., Crovace A M, Suchodolski J S. Effects of the Probiotic Mixture Slab51® (SivoMixx®) as Food Supplement in Healthy Dogs: Evaluation of Fecal Microbiota, Clinical Parameters and Immune Function. Front. Vet. Sci., 4 Sep. 2020, https://doi.org/10.3389/fvets.2020.00613.

A biochemical profile (glucose, urea, creatinine, GGT, GOT, AST, ALP, total protein, albumin, γGlobulin, cholesterol) was performed by collecting blood from the jugular vein in a serological tube at the beginning (To) and at the end $(T_8)$ of the study. The biochemical profile was determined with BT 3000 Plus (Biotecnica Instruments, Rome, Italy). To evaluate the effect of the "invention" on the systemic humoral responses, the total circulating IgG levels were measured in plasma. Blood was collected by venous sampling from the jugular vein in heparinised tubes at week 0 and every 2 weeks up to the eighth week of the study. Plasma was recovered from whole blood after fractionation and the same ELISA method described above was used to analyse the total IgG level in the plasma. The total amount of IgG in plasma was determined using ELISA plates coated with 100 ng/well of rabbit anti-canine IgG (Jackson Immunoresearch, Cambridge, UK) according to the method previously described (Rossi et. Al; Front. Vet. Sci., 4 Sep. 2020, https://doi.org/10.3389/fvets.2020.00613).

Cardinal data were assessed for normality using the Shapiro-Wilk test. Food intake, body weight and blood biochemical parameters were compared between groups using t-test or Mann-Whitney test, where appropriate; food intake and body weight were also compared between study periods within each group using repeated measures ANOVA or Friedman test, where appropriate; blood biochemical parameters were also compared between the beginning (To) and the end of the study $(T_8)$ within each group using paired t-test or paired Wilcoxon test or paired Wilcoxon t-tests, where appropriate.

BCS and FSS were analysed using the Mann-Whitney test and the Friedman test to perform comparisons between groups and between study periods within each group, respectively.

Antibody titres in sera and faeces were analysed by Student's t-test for comparison between groups. Within each group, ANOVA was used for repeated measurements followed by Holm-Sidak's post-hoc test to compare the time of each study with respect to $T_0$.

The data were statistically analysed with GraphPad Prism, version 8.2.1 for MacOS (GraphPad software Inc., San Diego, California, USA). A difference with a value p<0.05 was considered statistically significant for all analyses described above.

No dogs showed any side effects during the trial and all were healthy. Food intake and body weight, BCS, FSS and blood biochemical parameters (data not shown) did not differ statistically between the two groups during the study (p>0.05).

Faecal IgA titres (FIG. 1) were similar between the two groups at the beginning of the study (To) and after two weeks $(T_2)$, but showed a significantly higher level in the group of the treated dogs in which the "Invention" was added to the diet (Group A) compared to the controls (Group B) at $T_4$ (t=-3.214; p=0.005), $T_6$ (t=-2.796; p=0.012) and $T_8$ (t=-8.587; p<0.0001). These data are similar to the data obtained in a recent trial study in which a mixture of commercial probiotics was administered to healthy dogs (Rossi et. Al; Effects of the Probiotic Mixture Slab51@ (SivoMixx®) as Food Supplement in Healthy Dogs: Evaluation of Fecal Microbiota, Clinical Parameters and Immune Function. Front. Vet. Sci., 4 Sep. 2020, https://doi.org/10.3389/fvets.2020.00613).

Comparing the baseline value (To) of IgA with those of each study period, a progressive increase in antibody titre was observed within Group A (F=71.197; p<0.0001), with a significant difference already appreciated at $T_4$ (p<0.05) and during the entire subsequent follow-up (p<0.05). In group A, the IgA titre at 8 weeks (0.268±0.020 OD450 nm±SEM) was 4.6 times higher than the initial titre (0.058±0.004 OD 450 nm±SEM). Group B showed no significant change in faecal antibody concentration during the study; the IgA titre at 8 weeks (0.096±0.002 OD450 nm±SEM) was not statistically different from the initial titre (0.074±0.006 OD450 nm±SEM).

Plasma IgG concentrations were similar between the two groups at the beginning of the study (To) and after two weeks $(T_2)$, but showed a significantly higher level in the Slab51@-treated group (Group A) compared to the controls (Group B) at $T_4$ (t=-5.748; p<0.0001), $T_6$ (t=-6.346; p<0.0001) and at $T_8$ (t=-18.765; p<0.0001).

Comparing the baseline value (To) of IgG with those of each study period, a progressive increase in antibody titre was observed within Group A (F=161.146; p<0.0001), with a significant increase already appreciated at $T_4$ (p<0.05) and during the entire subsequent follow-up (p<0.05). In group A, the IgG titre at 8 weeks (11.020±0.261 g/L±SEM) was 2.2 times higher than the initial titre (5.012±0.199 g/L±SEM).

No significant difference in plasma antibody trend was observed within group B when comparing the initial value (To) with each time point in the study. In group B, the IgG titre at 8 weeks (5.472±0.138 g/L±SEM) was not statistically different from the initial titre (5.435±0.225 g/L±SEM).

The study highlights that dry food supplementation with the composition of the present invention has no measurable side effects on dogs (Group A), with no differences in food intake, weight loss or serum chemical parameters between the two groups. It is interesting to note that the study shows that supplementation with the composition of the present invention improves mucosal (local) and systemic (plasma) immune functions in terms of IgA and IgG concentration.

The various killed/inactivated organisms (yeasts, bacteria, fungi, protozoa and viruses) that make up the composition of the present invention directly trigger and stimulate the immune system underlying the intestinal mucosa.

In addition, changes in the total amount of IgG in plasma also indicate a systemic response to GALT polarisation and to the stimulation by the intraluminal enteric probiotic flora. In conclusion, the results reported in this clinical trial support the safety and the palatability of the composition of the present invention, which represents a probiotic mixture with many nutrients that exert a pre-biotic function. Tyndallization of the product does not modify the antigenic role of the mixture, causing an evident humoral and mucosal response (in treated dogs), similar to that obtained in previous studies carried out by supplementing the normal diet with live probiotic bacteria (Rossi et. al; Front. Vet. Sci., 4 Sep. 2020,https://doi.org/10.3389/fvets.2020.00613).

The biochemical, blood and plasma parameters were unaltered in both study groups (dogs in group A supplemented with the "Invention" and unsupplemented dogs in group B), suggesting the safety and the efficacy of the supplementation in treated dogs. An interesting adjuvant effect of our "Invention" in treated dogs is evident after two months of oral treatment both at the mucosal and systemic level. This effect could be relevant for enhancing the protective immune response against infections during the critical weaning period and in later phases in life.

The invention claimed is:

1. A composition comprising:
(a) a dry extract of a ruminal content of a bovine animal, wherein the ruminal content comprises a plurality of bacterial cells with inactivated replication capacity and inactivated enzymatic capacity while maintaining bacterial cell structure and bacterial cell wall structure;
(b) a dry extract of a ruminal content of a sheep, wherein the ruminal content comprises a plurality of bacterial cells with inactivated replication capacity and inactivated enzymatic capacity while maintaining bacterial cell structure and bacterial cell wall structure; and
(c) a caecal content of a rabbit, wherein the caecal content comprises a plurality of bacterial cells with inactivated replication capacity and inactivated enzymatic capacity while maintaining bacterial cell structure and bacterial cell wall structure
wherein the composition comprises: moisture 7.17 weight %; dry matter 92.83 weight %; crude protein 17.13 weight %; ashes 7.49 weight %; ether extract 2.81 weight %; fat 1.10 weight %; crude fibre 24.58 weight %; nitrogen-free extract (NFE) 40.82 weight %.

2. The composition of claim 1, having a final bacterial concentration of between about $10^{10}$-$10^{11}$ bacterial cells/ml.

3. A method for supplementing the diet of an animal comprising administering to the animal a composition of claim 1.

4. A dietary supplement comprising the composition of claim 1.

5. A method for stimulating an immune system in an animal comprising administering to the animal in need thereof a dietary supplement of claim 4.

6. A method for treating a disease comprising administering to an animal in need thereof a composition of claim 1, wherein the disease is selected in the group consisting of: dysbiosis, an infection caused by an enteropathogen, gastritis, diarrhoea, diabetes, chronic renal pathologies, atopic dermatitis, hepatic encephalopathy, inflammatory bowel disease (IBD), fibre reactive enteritis, antibiotic reactive enteritis, corticosteroid reactive enteritis, histiocytic colitis of the dog, chronic colonic dysmotility, chronic constipation of the cat, mucoid enterocolitis of the rabbit, porcine intestinal adenopathy, *Lawsonia intracellularis* disease of pigs, lactose malabsorption, necrotizing enteritis of the chicken, hepatic lipidosis syndrome, and colic syndrome of the horse.

7. The method of claim 6, wherein the enteropathogen comprises bacteria of the genus *Helicobacter, Giardia, Coccidia* or *Tritrichomonas*.

8. A method for stimulating an immune system in an animal comprising administering to the animal in need thereof a composition of claim 1.

9. A composition comprising a dry extract comprising:
(a) ruminal content of a bovine animal,
(b) ruminal content of a sheep; and
(c) a caecal content of a rabbit,
wherein the composition comprises: moisture 7.17 weight %; dry matter 92.83 weight %; crude protein 17.13 weight %; ashes 7.49 weight %; ether extract 2.81 weight %; fat 1.10 weight %; crude fibre 24.58 weight %; nitrogen-free extract (NFE) 40.82 weight %.

10. A method for supplementing the diet of an animal comprising administering to the animal a composition of claim 9.

11. A dietary supplement comprising the composition of claim 9.

12. The dietary supplement of claim 11, having a bacterial concentration of between about $10^{10}$-$10^{11}$ bacterial cells/ml.

13. A process for preparing a composition comprising a dry extract of bovine ruminal content, ovine ruminal content and rabbit caecal content,
wherein the bovine ruminal content and the ovine ruminal content comprise a plurality of bacterial cells with inactivated replication capacity and inactivated enzymatic capacity while maintaining bacterial cell structure and bacterial cell wall structure,
wherein the caecal content comprises a plurality of bacterial cells with inactivated replication capacity and inactivated enzymatic capacity while maintaining bacterial cell structure and bacterial cell wall structure,
the method comprising:
(a) tyndallization of the bovine ruminal content, the ovine ruminal content and the rabbit caecal content in block mode, and followed by
(b) atomization of the bovine ruminal content, the ovine ruminal content and the rabbit caecal content.

14. The process of claim 13, wherein the tyndallization is performed by heating the bovine ruminal content, the ovine ruminal content and the rabbit caecal content to a temperature comprised between about 70-100° C. and for a time comprised between about 15 and 30 minutes, followed by incubation of the bovine ruminal content, the ovine ruminal content and the rabbit caecal content at room temperature for a period of about 24 hours, repeated two or three times.

15. The process of claim 14, wherein the tyndallization comprises three heating steps at about 70° C. for a maximum of 30 minutes separated by an incubation period of about 24 hours.

16. The process of claim 13, wherein the atomization comprises successive steps, wherein the successive steps comprise:
(a) preparing a starting liquid product by adding a liquid to the bovine ruminal content, the ovine ruminal content and the rabbit caecal content tyndallized by step (a), thereby generating the starting liquid product;
(b) atomizing the starting liquid product into a spray form, wherein a plurality of droplets are generated by the spray, (c) contacting the plurality of droplets with a heated air flow to evaporate liquid from the starting liquid product to generate a plurality of dry solid particles, (d) separating the plurality of dry solid particles from the heated air flow; and (e) collecting the plurality of separated dry solid particles.

17. A composition made by a process of claim 13.

* * * * *